(12) United States Patent
Tirumalareddy et al.

(10) Patent No.: US 7,792,706 B2
(45) Date of Patent: Sep. 7, 2010

(54) METHOD AND SYSTEM OF PROVIDING RECOMMENDATIONS DURING ONLINE SHOPPING

(75) Inventors: Sundeep Tirumalareddy, Santa Clara, CA (US); Hayrettin Kolukisaoglu, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 473 days.

(21) Appl. No.: 11/835,341

(22) Filed: Aug. 7, 2007

(65) Prior Publication Data

US 2009/0043665 A1    Feb. 12, 2009

(51) Int. Cl.
*G06Q 30/00* (2006.01)
(52) U.S. Cl. .................................................. 705/26
(58) Field of Classification Search .................. 705/26, 705/27
See application file for complete search history.

(56) References Cited

U.S. PATENT DOCUMENTS 7,346,561 B1 *  3/2008  Devitt et al. .................. 705/27
2002/0019763 A1 *  2/2002  Linden et al. ................. 705/10
2003/0068080 A1 *  4/2003  Lu ............................. 382/162
2005/0004880 A1 *  1/2005  Musgrove et al. ........... 705/400
2006/0109734 A1 *  5/2006  Fukuda et al. .............. 365/232

OTHER PUBLICATIONS

Asim Ansari, Skander Essegaier, Rajeev Kohli., Internet recommendation systems JMR, Journal of Marketing Research. Chicago: Aug. 2000. vol. 37, Iss. 3; p. 363-375.*

* cited by examiner

*Primary Examiner*—Jeffrey A Smith
*Assistant Examiner*—Brandy Zukanovich
(74) *Attorney, Agent, or Firm*—Hickman Palermo Truong & Becker LLP

(57) ABSTRACT

A method for facilitating online shopping stores shopping cart information of users who shopped before and makes recommendations for matching products according to aggregated shopping cart information. The method finds out what products go well with a product in a user's shopping cart by collecting data about combinations of products in different categories from the shopping carts of users who shopped before. Based on the collected shopping cart data, the method recommends popular matches to the user.

20 Claims, 5 Drawing Sheets

| Shopping cart | Category | Sub-category | Brand | Color | ... | Checked out? | Category | Sub-category | Brand | Color | ... | Checked out? |
|---|---|---|---|---|---|---|---|---|---|---|---|---|
| 0001 | pants | athletic | Puma | white | | yes | shoes | Running | Adidas | blue | | yes |
| 0002 | skirt | | Ralph Lauren | vanilla | | yes | shirt | | Tommy Hilfiger | white | | yes |
| 0003 | dress | | | green | | yes | | | | | | |
| 0004 | dress | | | white | | yes | shoes | | | silver | | yes |
| 0005 | shoes | | | black | | yes | | | | | | |
| 0006 | shirt | | | orange | | no | sandal | | | gold | | no |
| 0007 | pants | | | blue | | yes | shirt | | | white | | yes |
| 0008 | pants | | | gray | | no | jeans | | | blue | | yes |
| 0009 | shirt | | | white | | no | handbag | | | black | | yes |
| 0010 | shoes | | | black | | yes | | | | | | |
| ... | | | | | | | | | | | | |
| A | Running shoes | | Nike | Blue | | | | | | | | |

Fig. 2

METHOD AND SYSTEM OF PROVIDING RECOMMENDATIONS DURING ONLINE SHOPPING

CROSS REFERENCE TO RELATED APPLICATIONS

This application is related to U.S. patent application Ser. No. 11/835,337, filed on the same day as the instant application and entitled "Method and System of Facilitating Search by Color," which is hereby incorporated by reference in its entirety.

BACKGROUND

1. Field of the Invention

The present invention relates generally to online shopping, and more particularly to a method for providing recommendations to a user at a website based on aggregated shopping cart information from one or more users who have shopped at the website.

2. Description of Related Art

Online shopping has many advantages over traditional shopping. A user can easily search and browse merchandise on an unlimited number of seller web sites, compare prices, and place orders from a computer in a short period of time, without spending time actually visiting any stores. In addition, some online web sites provide shopping recommendations to the user to further improve the online shopping experience.

For example, an existing online book shopping website provides information about similar books to users. A user may be planning a trip to San Francisco and is searching for books about San Francisco. Among various books, the user may be interested in a book named *Frommer's San Francisco 2007*. After reading information about the book, the user may put the book in a shopping cart. A shopping cart screen may be presented to the user. This screen may include information about the user's shopping cart, e.g., the name of the book, the picture of its cover, and the author and price of the book. In addition, the screen may also include information about similar books. Under a line "Customers who bought this book also bought," information about the book *Fodor's San Francisco 2007* and the book San Francisco (*Eyewitness Travel Guides*) may be shown, including their pictures, authors and prices.

Sometimes, users may appreciate suggestions about complementary or matching products. For instance, a user may be interested in buying a garment and wants to buy a pair of shoes to wear with the garment. But the user may not be sure which color and style of shoes go well with her garment, and needs some recommendations. An existing online apparel shopping website provides information about matching products to users. In one example, the user is interested in a silk print blouse and has put it into the shopping cart. A shopping cart screen may be presented to the user. The screen may show information about items in the shopping cart, e.g., a picture of a model in the blouse, name of the blouse, and its color, size and price. Below that, the screen may show a picture of a model wearing the blouse, a black skirt, and a pair of black sandals and a "Shop this outfit" button. If the user clicks on the "Shop this outfit" button, detailed information about the skirt and the sandals may be shown on the next screen. However, the matching items on this website are selected by a designer in advance, instead of being based on the taste of users who have shopped on the website. This site cannot help the user to find out what type of shoes other users have picked for their silk print blouses.

There is a need for a method that provides shopping recommendations for matching items according to users' sense of style.

BRIEF DESCRIPTION OF THE DRAWING FIGURES

Embodiments of the present invention are described herein with reference to the accompanying drawings, similar reference numbers being used to indicate functionally similar elements.

FIG. 2 shows a shopping cart information database table according to an embodiment of the present invention.

DETAILED DESCRIPTION

The present invention provides a method of making recommendations for matching products according to aggregated shopping cart information of users. The method finds out what products may go well with a product in a user's shopping cart by collecting data about combinations of products in different categories from the shopping carts of users who have shopped before. Based on the collected shopping cart data, the method recommends popular matches to the user. The invention makes the online shopping process faster, easier and more user oriented. The invention could be carried out by computer-executable instructions, such as program modules. Advantages of the present invention will become apparent from the following detailed description.

Figure 1:
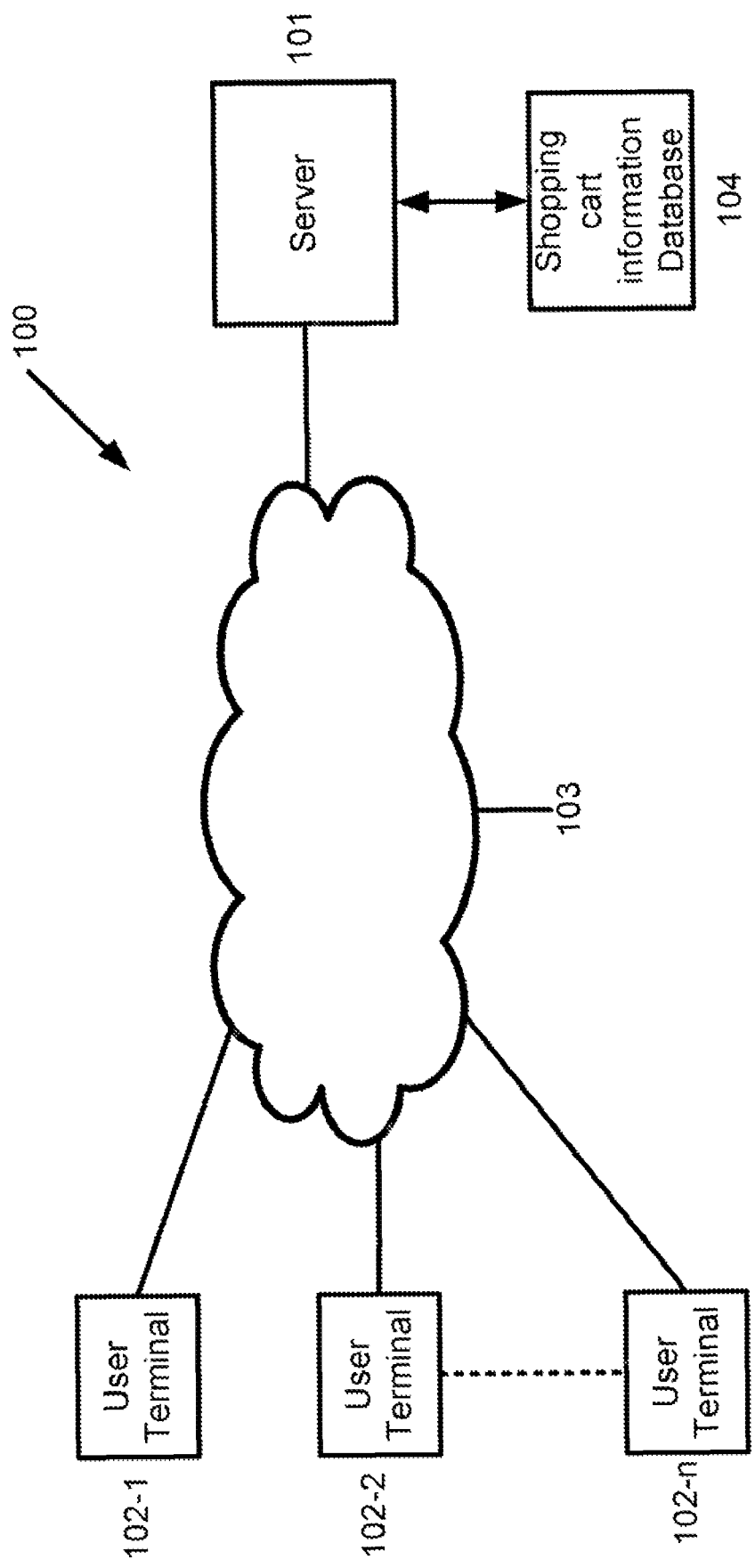
FIG. 1 illustrates an online shopping system according to an embodiment of the present invention.

FIG. 1 illustrates an online shopping system according to an embodiment of the present invention. The online shopping system 100 has a server 101, with which a number of user terminals 102-1, 102-2, . . . 102-*n*, not necessarily part of the system 100, may communicate over a network 103. The server 101 accesses data in a shopping cart information database 104. The server 101 may be a computer system, which includes a screen, an input device, a processing unit, a system memory, ports for communicating with the network 103 and a system bus coupling various components in the computer system. The user terminals may be personal computers, handheld or laptop devices, microprocessor-based systems, set top boxes, or programmable consumer electronics.

FIG. 2 shows a shopping cart information database table according to an embodiment of the present invention. Each row may contain data about items in a shopping cart. Each column may contain data representing one type of attribute of the items in the shopping carts, e.g., category, brand, and color. As shown, a shopping cart 0001 has two items: a pair of Puma™ brand white pants, and a pair of Adidas™ brand blue shoes. A shopping cart 0002 has two items: a Ralph Lauren™ brand skirt in vanilla, and a Tommy Hilfiger™ brand shirt in white.

It should be understood that the database table may use more or fewer types of attribute data for items in the shopping cart. The database table shown in FIG. 2 may include a column "Sub-category" to further define the items in the shopping cart. For example, the sub-category for the Puma™ pants is "athletic," and the sub-category for the Adidas™ shoes is "running." The database table may include a column "Checked out?" for each item in the shopping cart to indicate whether the item has been actually purchased.

The records in the database table may be set to expire after a certain period of time, e.g., 6 months. The selection of the length of the period may involve a balance of various considerations. If the period is too short, the data may not be statistically meaningful. If the period is too long, the system may present out-of-date shopping recommendations, including for example out of style recommendations, or recommendations for a product that is no longer available.

Figure 3A:
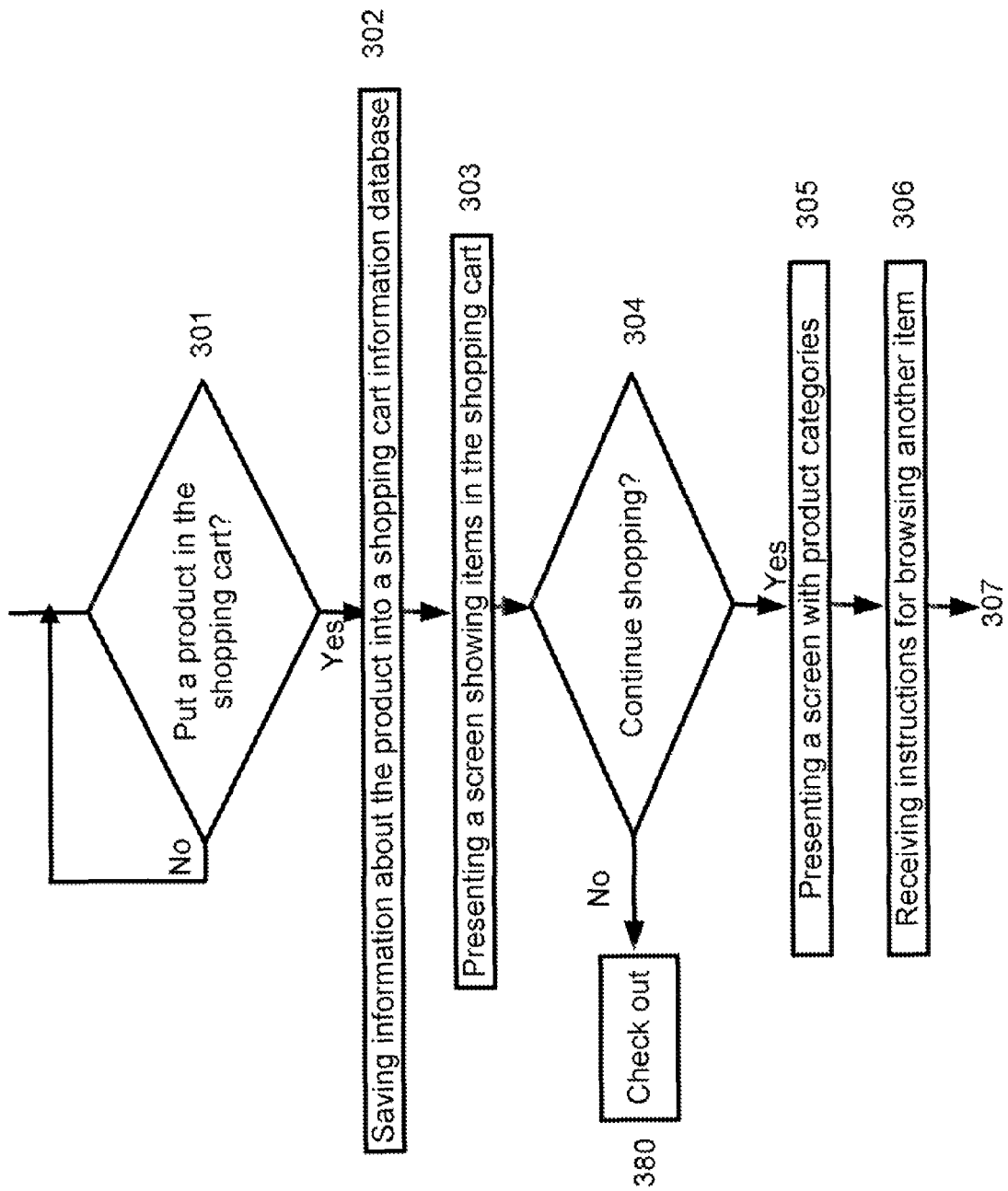
FIGS. 3A and 3B illustrate a flow chart for a method of providing shopping recommendations according to one embodiment of the present invention.
Figure 3B:
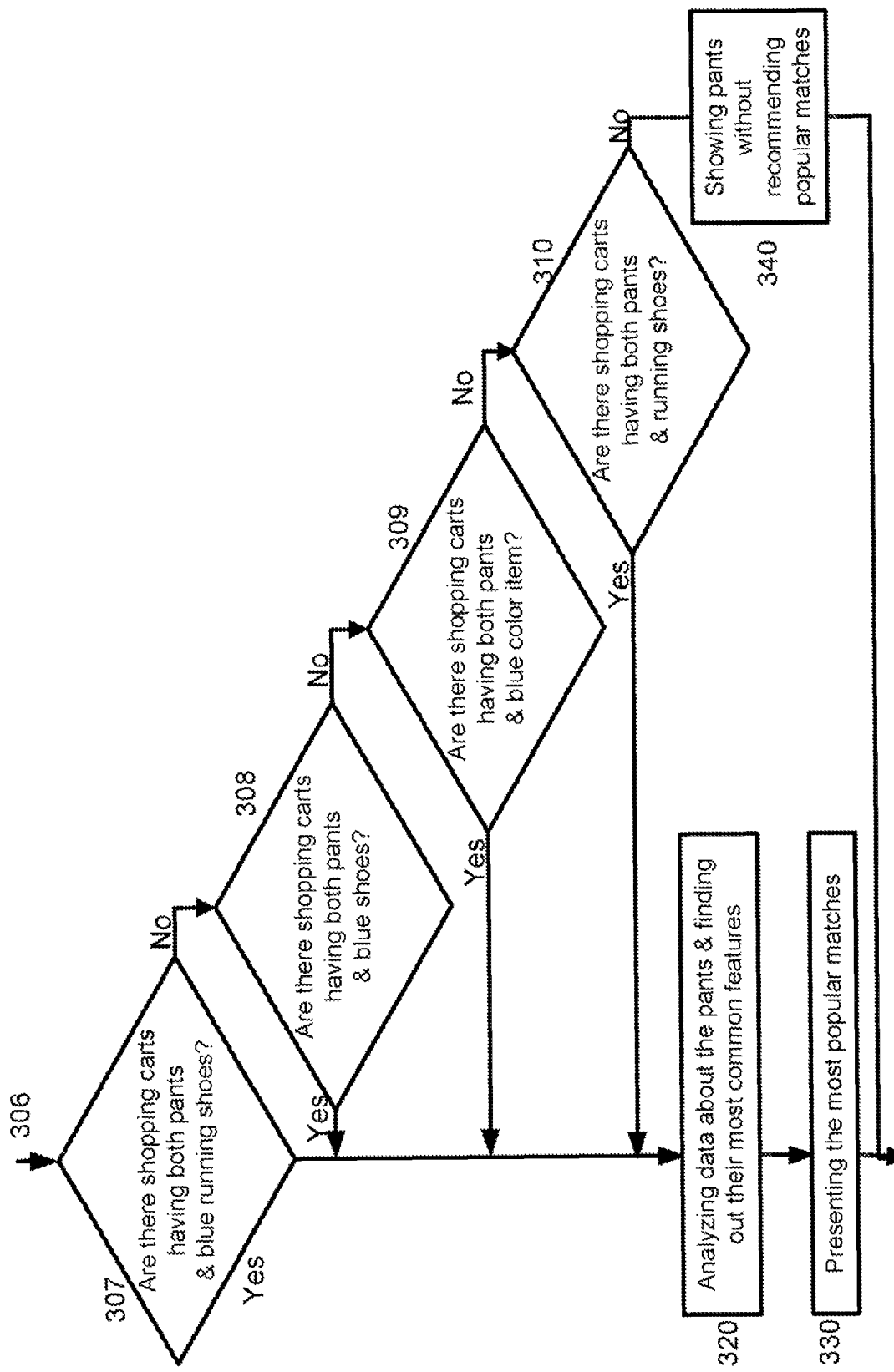

FIGS. 3A and 3B illustrate a flow chart of a method of providing shopping recommendations according to one embodiment of the present invention.

At 301, a user browser for items on a website (for example, over a user terminal 102-1,) selects an item (for example, a pair of blue running shoes), and puts the item into a shopping cart.

At 302, shopping cart information about the item is saved in the database 104 as a record for shopping cart A. The shopping cart information may include, for example: category "shoes," and color "blue." The shopping cart information may further include, e.g., sub-category "running" and/or "cross-country" or "cross-training," and/or brand Adidas™. Price and quantity, along with size and other attributes, also may be saved.

A screen may be displayed at 303, showing (graphically, textually, or otherwise) items in the shopping cart, e.g., a picture of the shoes, their name (Adidas™ running shoes), their color (blue), size (10), quantity (1 pair), and price ($50). The screen may have buttons "Check out" and "Continue shopping". It should be understood that 303 could be performed before 302.

If the user clicks the "Check out" button, the procedure may proceed to 380 to collect or retrieve the user's billing and mailing information, either from the user or from another facility, and at the same time may update the field "Checked out" in the shopping cart information database 104 to "yes". Updating may be postponed until the purchase transaction is complete. If the user clicks the "Continue shopping" button at 304, a screen may be displayed at 305, showing some merchandise categories, including, e.g., Coats & Jackets, Pants, Shirts, Shoes, Sweaters, Suits.

If the user clicks the button for another item, for example, pants, at 306, the server 101 may search the shopping cart information database 104 to find out information about pants other users put into their shopping carts to match blue running shoes.

The server starts with the search criteria "blue running shoes". At 307, the server finds out whether there are shopping carts having both pants and "blue running shoes". If there are, then at 320, the server analyzes data about these pants to find out their most common features, e.g., color (such as white) or sub-category (such as athletic pants). From the most common features, the system may find out what colors and/or products tend to match each other well, and may draw a conclusion about the fashion sense of other shoppers from what those shoppers have previously put in their shopping carts. Based on this kind of information, the system can provide shopping recommendations.

At 330, the most common features may be shown as the most popular matches to the blue running shoes on a screen, e.g., "Blue running shoes go well with white athletic pants," or "11% of shoppers who bought blue running shoes also bought white athletic pants, and 8% shoppers who bought blue running shoes also bought gray casual pants." The pants then may be shown to the user according to their popularity. In this embodiment, white athletic pants may be displayed first, and then gray casual pants may be displayed. The procedure may then return to 301 to monitor whether the user puts any pants into the shopping cart.

If there is no data on shopping carts having both blue running shoes and pants, the server 101 may broaden the search by finding out whether there are shopping carts which have both pants and "blue shoes" at 308. If yes, the procedure proceeds to 320 to analyze data about these pants and find out the most common features of these pants, e.g., white color, bell bottoms, brand. At 330, the most common features are shown as the most popular matches to the blue shoes on a screen, e.g., "Blue shoes go well with white pants," or "13% of shoppers who bought blue shoes also bought white pants, and 10% of shoppers who bought blue shoes also bought gray pants." White pants may be displayed first on the screen, and then gray pants may be displayed. The procedure may then return to 301.

If there is no shopping cart having both blue shoes and pants, the server 101 may broaden the search still further by finding out whether there are shopping carts which have both pants and any blue item at 309. If yes, the procedure proceeds to 320 to analyze data about these items and find out their most common features, e.g., white color. At 330, the most common features may be shown as the most popular matches to the blue shoes on a screen, e.g., "Blue goes well with white". White pants may be displayed first on the screen. The procedure may then return to 301.

If there is no shopping cart having both pants and blue items, the server 101 may broaden the search still further to determine whether there are shopping carts which have both pants and running shoes at 310. If yes, the procedure proceeds to 320 to analyze data about these pants and find out their most common features, e.g., athletic pants or casual pants. At 330, the most common features may be shown as the most popular matches to the blue shoes on a screen, e.g., "Running shoes go well with athletic pants," or "10% of shoppers who bought running shoes also bought athletic pants, and 8% of shoppers who bought running shoes also bought casual pants." Athletic pants are displayed first on the screen, and then casual pants are displayed. The procedure may then return to 301.

If there are no shopping carts having both pants and running shoes, the system may display pants without providing any recommendations at 340. The procedure may then return to 301 to monitor whether the user puts any pants into the shopping cart.

It should be understood that the server could start its search by looking for shopping carts having pants and a blue item or having pants and running shoes directly, instead of gradually broadening the search by going through each the steps shown in FIGS. 3A and 3B. One or more of the intermediate steps could be omitted, or the steps shown could be followed, in whole or in part, in a different order from what is shown.

In the embodiment described above, the information about the color of products in the user's shopping cart and in the shopping cart information database may come from the seller's website. In another embodiment, the color information may be based on color space or color model parameter values. Details are described in the above-referenced U.S. patent application.

Figure 4:
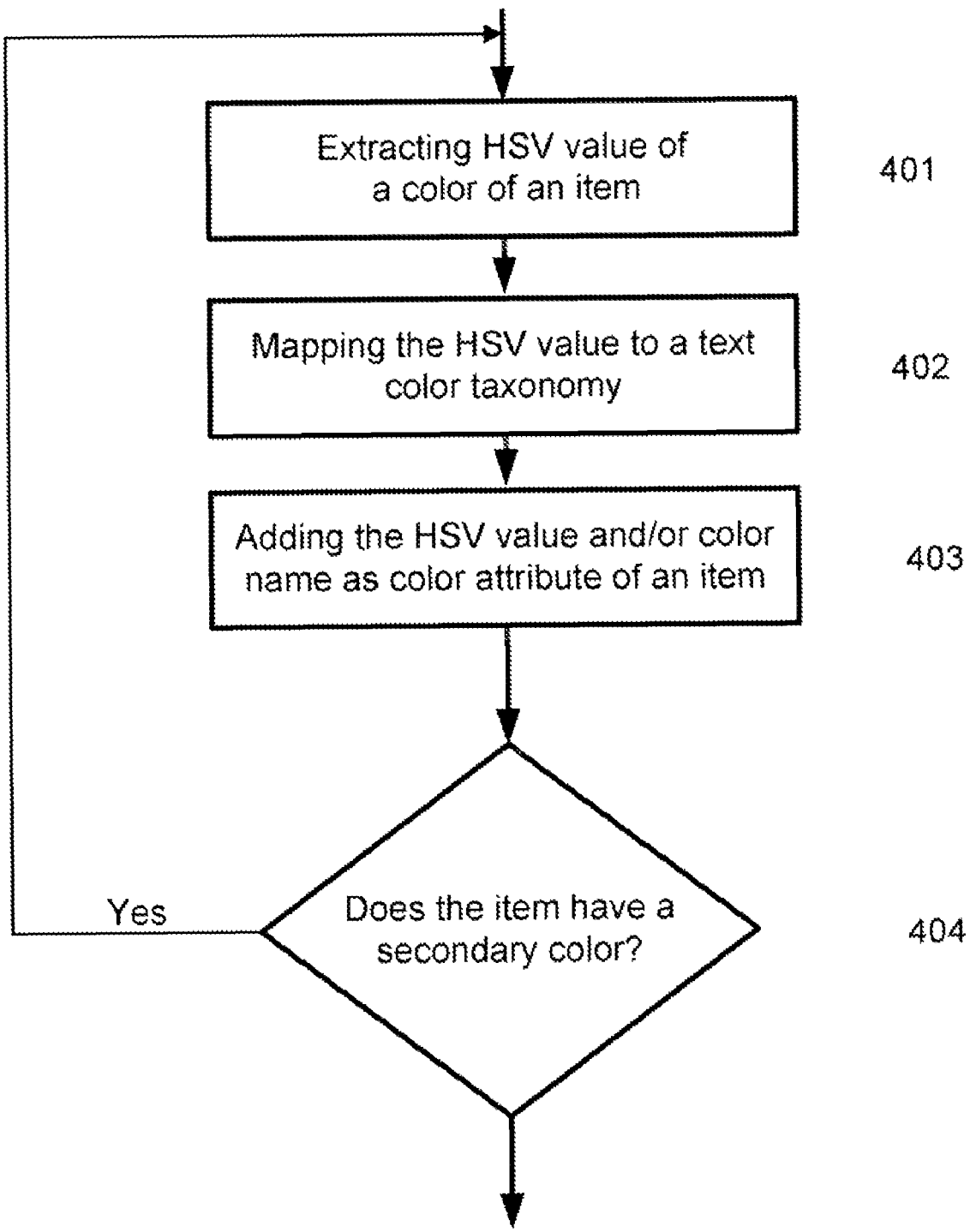
FIG. 4 illustrates a method for obtaining color information in the shopping cart information database according to one embodiment of the present invention.

FIG. 4 illustrates a flowchart of a method for getting color information in the shopping cart information database according to one embodiment of the present invention. At 401, the server 101 may obtain an image of an item, for example, a pair of Adidas™ shoes, and may process the image to extract color space or color model parameter values of the primary color of the shoes. In one embodiment, the color model may be the HSV (Hue, Saturation, Value) model, which is also known as the HSB (Hue, Saturation, Brightness) model. The HSV model separates color into three parameters. Hue (H) defines the color and may range from 0 to 360°. Each H value corresponds to one color, e.g., 0° is red, and 55° is a shade of yellow. Saturation (S) defines the intensity of the color and ranges between 0-100%, wherein 0 means no color (e.g. a shade of gray between black and white), and 100 means intense color. Value (V) defines the brightness of the color and ranges between 0-100%, wherein 0 corresponds to black, and 100 may be white or a more or less saturated color. The HSV value for the Adidas™ shoes in this example is 240°/100.0%/80%. It should be understood that the color model could also be the HLS (Hue, Saturation, Lightness) model or the RGB (Red, Green and Blue) model. There are other color models and color spaces that are based, to a greater or lesser extent, on primary colors. These also are within the scope of the invention.

At 402, the HSV value obtained at 401 may be mapped to a text color taxonomy. The text color taxonomy identifies each HSV value with one or more words. For example, an HSV value (3°/95%/95%) may be called bright intense red; an HSV value (120°/100.0%/39.2%) may be called dark green; an HSV value (120°/80%/72%) may be called green; an HSV value (110°/55%/95%) may be called light green; an HSV value (240°/0%/100%) may be called white; an HSV value (240°/100.0%/80%) may be called blue; and an HSV value (330°/55%/42%) may be called dark brown.

At 403, the HSV value and/or the color name are added as color information for items in the shopping cart information database.

If it is decided at 404 that the item has multiple colors, then 401-403 are repeated an appropriate number of times.

In one embodiment, when deciding the most common features at 320, the server may give more weight to a purchase experience versus a browsing experience, thereby gauging the seriousness of a shopper's selection. If a shopper put a combination of products in the shopping cart but did not actually purchase them, the combination may receive a lower weighting. Consequently, combinations of products that have actually been purchased get more importance. The system also may provide an intermediate level of importance to product combinations that have been checked out but not purchased (depending on the purchasing process that the Web site follows). In this fashion, the most common features on which the system focuses may be closer to the taste of a group of shoppers, which may represent the entire group that has sought this particular item or combination of items, or may represent a subset in a particular demographic, depending on the amount of shopper information that is available to the system.

Accordingly, the present invention can mine shopping cart information to obtain users' fashion sense, and then can provide shopping recommendations based on that fashion sense. Although the described embodiment focuses on apparel shopping, the inventive method could be used in online shopping for a number of other products, e.g., home furniture and/or furnishings, home or commercial electronics, cosmetics and/or toiletries, food, kitchen equipment, travel equipment (luggage), among others. In addition, while this specification uses the term "shopping cart" as an example of a virtual container, other terms may be used, such as "shopping bag" or "brown bag". Items in the virtual container may also include items clicked on or viewed by a user within a browsing session.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method for providing recommendations during online shopping, comprising:
   receiving a first input for storing a first product in a virtual shopping container, wherein the first product has a first set of attributes;
   receiving a second input for browsing for products in a particular category;
   in response to the second input, determining a particular set of previously saved virtual shopping cart containers by performing a search of a database for previously saved virtual shopping containers that contain a combination of:
      (a) one or more products that match one or more attributes in said first set of attributes, and
      (b) one or more products from said particular category;
   determining a second set of attributes that are most common to products, from said particular category, that are contained in said particular set of previously saved virtual shopping containers; and
   providing a recommendation for a second product, from said particular category, having one or more attributes from said second set of attributes;
   wherein the method is performed by one or more computing devices.

2. The method of claim 1, wherein at least one of the one or more attributes in said first set of attributes and at least one of the one or more attributes in said second set of attributes comprise color information about the respective product, and wherein said providing comprises providing a recommendation for popular matches of colors.

3. The method of claim 1, wherein the particular set of previously saved virtual shopping containers includes at least one previously saved virtual shopping container that does not include said first product.

4. The method of claim 2, further comprising identifying color parameter values of a primary color of the respective product.

5. The method of claim 4, wherein the color parameter is based on the Hue, Saturation, Value (HSV) model.

6. The method of claim 1, wherein at least one of said one or more attributes in said second set comprises a sub-category of said particular category.

7. The method of claim 1, further comprising: giving a first weight to previously saved virtual shopping containers whose contents have been purchased, and giving a second, lower weight to previously saved virtual shopping containers whose contents have not been purchased, wherein said first and second weight are factored into determining said second set of attributes.

8. The method of claim 1, further comprising: responsive to an input for checking out a virtual shopping container containing the first product and the second product, saving information of the virtual shopping container into the database.

9. The method of claim 1, wherein data in the database expire after a predetermined duration.

10. The method of claim 4, wherein the color parameter is based on the Red, Green and Blue (RGB) model.

11. A computer readable storage medium storing instructions, which, when executed by one or more processors, cause the one or more processors to perform the method comprising the steps of
receiving a first input for storing a first product in a virtual shopping container,
wherein the first product has a first set of attributes;
receiving a second input for browsing for products in a particular category;
in response to the second input, determining a particular set of previously saved virtual shopping cart containers by performing a search of a database for previously saved virtual shopping containers that contain a combination of:
  (a) one or more products that match one or more attributes in said first set of attributes, and
  (b) one or more products from said particular category;
determining a second set of attributes that are most common to products, from said particular category, that are contained in said particular set of previously saved virtual shopping containers; and
providing a recommendation for a second product, from said particular category, having one or more attributes from said second set of attributes.

12. A server of an online-shopping system, comprising:
one or more computing devices comprising:
  a receiving unit, for receiving:
    (a) a first input for storing a first product in a virtual shopping container, wherein the first product has a first set of attributes, and
    (b) a second input for browsing for products in a particular category; and
  a processing unit, which:
    in response to the second input, determines a particular set of previously saved virtual shopping cart containers by performing a search of a database for previously saved virtual shopping containers that contain a combination of:
      (a) one or more products that match one or more attributes in said first set of attributes, and
      (b) one or more products from said particular category;
    determines a second set of attributes that are most common to products, from said particular category, that are contained in said particular set of previously saved virtual shopping containers; and
    provides a recommendation of a second product, from said particular category, having one or more attributes from said second set of attributes.

13. The server of claim 12, wherein at least one of the one or more attributes in said first set of attributes and at least one of the one or more attributes in said second set of attributes comprise color information about the respective product, and wherein said providing comprises providing a recommendation for popular matches of colors.

14. The server of claim 12, wherein the particular set of previously saved virtual shopping containers includes at least one previously saved virtual shopping container that does not include said first product.

15. The server of claim 13, wherein the processing unit further identifies color parameter values of a primary color of the respective product.

16. The server of claim 15, wherein the color parameter is Hue, Saturation, Value HSV model.

17. The server of claim 12, wherein at least one of said one or more attributes in second set comprises a sub-category of said particular category.

18. The server of claim 12, wherein the processing unit gives a first weight to previously saved virtual shopping containers whose contents have been purchased, and gives a second, lower weight to previously saved virtual shopping containers whose contents have not been purchased, wherein said first and second weight are factored into determining said second set of attributes.

19. The server of claim 12, wherein the processing unit sends to the database information about a virtual shopping container containing the first product and the second product, responsive to an input for checking out the virtual shopping container.

20. The server of claim 12, wherein the processing unit sets a duration of storage for data in the database.

* * * * *